(12) United States Patent
Takeuchi et al.

(10) Patent No.: US 8,625,214 B2
(45) Date of Patent: Jan. 7, 2014

(54) APPARATUS FOR DIGITAL RMS DETECTION AND PEAK DETECTION IN HEAD-DISK CONTACT DETECTION

(75) Inventors: Toru Takeuchi, Sagamihara (JP); Reza Sharifi, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 203 days.

(21) Appl. No.: 13/224,696

(22) Filed: Sep. 2, 2011

(65) Prior Publication Data

US 2013/0058201 A1    Mar. 7, 2013

(51) Int. Cl.
  *G11B 27/36*    (2006.01)
  *G11B 20/10*    (2006.01)
  *G11B 15/48*    (2006.01)

(52) U.S. Cl.
  USPC .................................. 360/31; 360/39; 360/75

(58) Field of Classification Search
  None
  See application file for complete search history.

(56) References Cited

U.S. PATENT DOCUMENTS

2002/0001151 A1 *   1/2002   Lake ................................ 360/55
2002/0097516 A1 *   7/2002   Gan et al. ........................ 360/75

* cited by examiner

*Primary Examiner* — Regina N Holder
(74) *Attorney, Agent, or Firm* — Alan A. R. Cooper; W. James Brady, III; Frederick J. Telecky, Jr.

(57) ABSTRACT

An apparatus comprises a root mean square ('RMS') value generator; an integrator coupled to the RMS value generator; a sample and hold switch coupled to an output of the integrator; a capacitor coupled between the sample and hold switch and a ground; an input of the analog to digital convertor ('ADC') coupled to the capacitor; an adder coupled to an output of the ADC; a register, wherein an output of the register is coupled to an input of the adder; and wherein an output of the adder is coupled to an input of the register; and a logic coupled to the register for comparing an output of the register to an RMS threshold value for determining whether a touchdown has occurred.

13 Claims, 5 Drawing Sheets

APPARATUS FOR DIGITAL RMS DETECTION AND PEAK DETECTION IN HEAD-DISK CONTACT DETECTION

TECHNICAL FIELD

This application is directed, in general, to touch-down detection, and, more specifically, to digital root-mean-square ('RMS') and peak detection in touch-down detection.

BACKGROUND

In today's society, the ability to quickly and efficiently store and retrieve digital information onto mass storage devices is becoming ever-more important. One such mass storage device is a hard disk drive ('HDD').

Typically, a magnetic head of an HDD has a Head-Disk Contact ('HDC') detection sensor, which detects a contact between the head and a disk media, referred to as a 'touch-down'. Generally speaking, the Head-Disk Contact detection sensor outputs a transient signal in response to such received impulses. A transient signal which exceeds a certain level is therefore recognized as a head-disk contact. This can occur during read mode or a write mode.

However, in certain noisy conditions, for example, a 'write' mode, which can be wherein a preamplifier drives a 'write' current to record a digital signal on the HDD, a distinction between a 'touch-down' signal and noise is difficult. In other words, it can be difficult to determine in some noisy environments whether a 'touch-down' has actually occurred.

In order to address this difficulty and ambiguity, various signal processing schemes have been employed. A RMS or peak-detection applied to a received Head-Disk Contact signal can be utilized. Generally speaking, if a RMS threshold or a peak-detection threshold is exceeded, a 'touch-down' is deemed to have occurred. Indeed, employment of the RMS value or peak value in one or multiple rotations is good criteria to judge head-disk touch-down (See FIG. 5) due to such factors as a defect or a roughness of a disk surface of the HDD.

However, these threshold detection schemes introduce further complications into a determination of when a 'touch-down' has occurred. For example, one rotation of the HDD, used for RMS and peak detection is more than millisecond. This can be unacceptably long. In the case of a 5400 rpm HDD, a rotation period is 11 mS, again, a long time period. Conventional implementations of RMS and peak detection for detection over this long time period typically require a very large area.

Therefore, there is a need in the art for to RMS and peak detection in touch-down detectors that addresses at least some of the concerns of conventional touch-down detection.

SUMMARY

In a first aspect, an apparatus comprises a root mean square ('RMS') value generator; an integrator coupled to the RMS value generator; a sample and hold switch coupled to an output of the integrator; a capacitor coupled between the sample and hold switch and a ground; an input of the analog to digital convertor ('ADC') coupled to the capacitor; an adder coupled to an output of the ADC; a register, wherein an output of the register is coupled to an input of the adder; and wherein an output of the adder is coupled to an input of the register; and a logic coupled to the register for comparing an output of the register to an RMS threshold value for determining whether a touch-down has occurred.

In a second aspect, an apparatus comprises a peak value generator; a sample and hold switch coupled to an output of the peak value generator; a capacitor coupled between the sample and hold switch and a ground; an input of the analog digital convertor ('ADC') coupled to the capacitor; a comparator coupled to an output of the ADC; a register, wherein an output of the register is coupled to the comparator; and wherein an output of the comparator is coupled to the register; and a logic coupled to the register for comparing an output of the register to a touch-down threshold value for determining whether a touch-down has occurred.

In a third aspect, an apparatus comprises a Head-Disk Contact ('HDC') detection sensor; a sensor root mean square ('RMS') value generator coupled to the HDC detection sensor; an integrator coupled to the RMS value generator; a sample and hold switch coupled to an output of the integrator; a capacitor coupled between the sample and hold switch and a ground; an input of the analog to digital convertor ('ADC') coupled to the capacitor; an adder coupled to an output of the ADC; a bit register, wherein an output of the bit register is coupled to an input of the adder; and wherein an output of the adder is coupled to an input of the n bit register; and a logic coupled to the bit register for comparing an output of the bit register to an RMS threshold value for determining whether a touch-down has occurred. An output value of the n bit register is derived from a plurality of RMS value samples.

BRIEF DESCRIPTION OF THE DRAWINGS

Reference is now made to the following descriptions.

DETAILED DESCRIPTION

Figure 1:
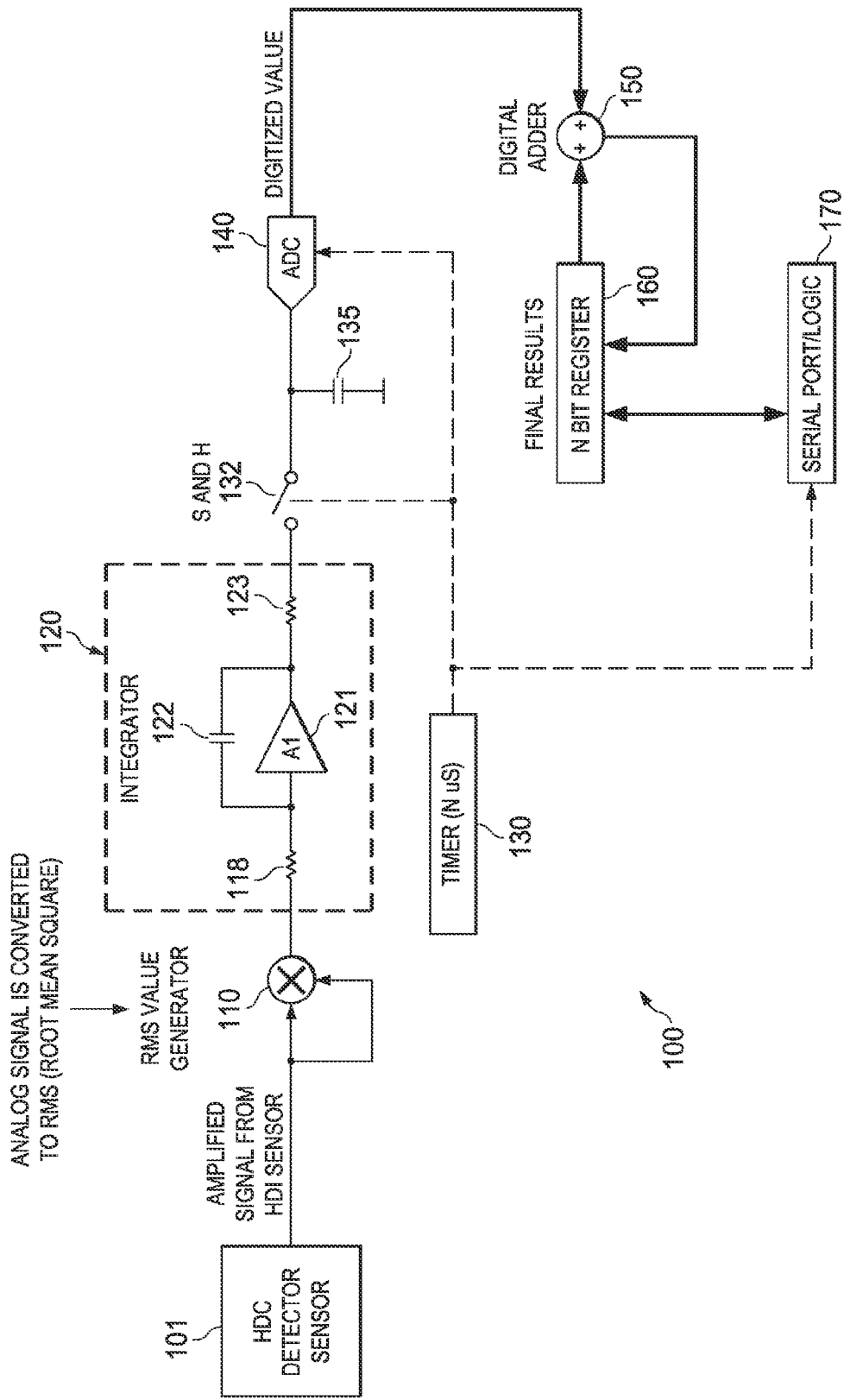
FIG. 1 illustrates an embodiment of a RMS detector that determines a touch-down.

Turning to FIG. 1, illustrated is a RMS detector 100. In the RMS detector 100, a signal, such as an amplified analog signal from a head-disk contact ('HDC') detection sensor 101 is conveyed to a RMS value generator 110, which can include a rectifier. The output of the RMS value generator 110 is then integrated by an integrator 120 having an amplifier 121, a capacitor 122, and a resistor 123. In other embodiments, other devices that generate an RMS value can be used for the RMS generator 110.

An output of the integrator 120 is then coupled to a sample and hold ('S and H') switch 132. The S and H switch 132 is driven by a timer 130. In one embodiment, the timer 130 increments in microseconds. The S and H switch 132 is coupled to a capacitor 135. The capacitor 135 is coupled to ground.

In one embodiment, in the RMS detector 100, a signal is received, such as from the HDC detection sensor 101. An RMS value is generated by the RMS value generator 110, which is integrated by the integrator 120. The value of the integrated value, an analog signal, is then sampled by the S and H switch 132, and held at the capacitor 135. Then, the sampled analog signal is converted in an analog-to-digital converter ('ADC') 140. The timer 130 also drives the ADC conversion, and the timer 130 is coupled to the ADC 140. This digitized value, representing an integrated individual time slice of a squared RMS noise value, is then conveyed to a digital adder 150, and summed. Coupled to the digital adder 150 is an n bit register 160. The digital adder 150 conveys its sums to the n bit register 160, which stores the final results.

The n bit register 160 is also coupled to a serial port/logic ('logic') 170, which is also coupled to and driven by the timer 130. The logic 170 can itself be used to determine whether a touch-down has actually occurred, or whether the circuit 100 is encountering other noise, through comparison of the final result to an RMS threshold value. The logic 170 can also convey state of the sums within the n bit register 160 to outside the RMS detector 100.

As employed in the RMS detector 100, a primary approach to dealing with the problems of touch-down detection generally concerns replacing analog electronics with digital electronics. What this advantageously further allows is a substitution of a much smaller capacitor, such as capacitor 135, for a larger capacitor, as will be described below.

Generally, the RMS detector 100 determines discrete time intervals of RMS values, and then sums those RMS values. Generally, in the RMS detector 100, a whole measured period is divided into time zones, and an analog RMS value is digitized for each zone. Each time zone controlled by the timer 130 and is stored as a digital value in the n bit register 160. In one embodiment, when determining RMS values, the digital value can be added repeatedly during one of multiple rotational periods, then the sum of the digital values as determined in the digital adder 150 is the RMS value of the whole period, which can then be used as a criteria for a touch-down.

Generally, the RMS equation for a continuous waveform can be written as follows:

$$f_{rms} = \sqrt{\frac{1}{T_2 - T_1} \int_{T_1}^{T_2} [f(t)]^2 \, dt}, \quad \text{Equation 1:}$$

The 'T' represents the time over which the RMS is to be determined, and the integral of the voltage squared represents the RMS value over time. Equation 1 yields average RMS value for a time period 'T'.

In manifesting this equation in analog circuit form, the time constant 'T' is therefore implemented. This time constant can be in the form of a low-pass RC integrator. Moreover, the cutoff frequency is ½πRC. A timed decay of a low pass integrator is $e^{-t/RC}$. Therefore, in conventional systems, in order to have a suitably long time constant 'T' for an HDC detection, disadvantageously either a 'large' capacitor needs to be employed, a 'large' resistor needs to be employed, or both. This in turn affects the cut off frequency.

However, both of these approaches create problems: a prior art 'large' capacitor uses up too much real estate in a given HDC detection circuit; on the other hand, 'large' resistors also require large real state as well. Moreover, a 'large' resistance is prone to external noise, and furthermore a smaller current makes HDC detection circuit design sensitive to leakage current. In other words, a signal-noise ratio can be degraded by large resistance (or smaller current).

For example, for a time constant of 12 milliseconds, used to determine a prior art RMS value, a resistor value could be 1000 Ohms and a corresponding capacitor value would be 0.000120 farads (12 microfarads), {RC=12 mS, a R=1 k, which in turn means C=12 uF (microfarads)}, which is an impracticable value due to at least in part a comparatively huge area required by the 12 microfarad capacitor (for example, ~3 mm$^{-2}$ which can be larger than a whole die area for a prior art HDC detector). As a second example, if the resistance of 10K Ohms is employed, there is a capacitance of 1.2 microfarads, {RC=12 mS. R=10 k means C=1.2 uF (microfarad).} However, even this capacitor value is not an achievable number, as it is still too large, and moreover under this configuration the resistor value can be prone to the problems mentioned above.

In the present application, an alternative approach is employed. In the present embodiment, an addition of digital values is utilized for RMS and peak-detection of a HDD touch-down detection, wherein the application employs the insight that a large 'time constant' for determination of a RMS (or peak) value can be subdivided into a plurality of individually-sampled smaller analog values for these individual time constants, and that these smaller samples can then be added or otherwise compared to determine the final RMS or peak detection. Advantageously, the above alternative RMS approach allows a smaller time constant to be employed, which in turn allows for a smaller RC value, which can then in turn allow for values for both R and C, such as resistor 123 and capacitor 122, that are within a manufacturing norm or acceptable size norms for the RMS detector 100.

For example, for an overall time constant of 12 milliseconds, if one hundred twenty eight RMS samples are employed by S and H switch 132 per second, this is a time constant of 012/128 individual samples, or a time constant of 93.75×10$^{-6}$, which can lead to a 1K resistor 123 and a 93.75×10$^{-9}$ (nanofarad) capacitor 122, more manageable values.

The above insight can be expressed in the following equation, Equation 2:

$$f_{rms}^2 = \sum_n \frac{1}{\Delta T} \int_{T_n}^{T_{n+1}} f(t)^2 \, dt.$$

As is illustrated, the RMS is broken up into a number of individual time determinations, and each time period is then summed, and then the square root is taken of this.

Figure 2:
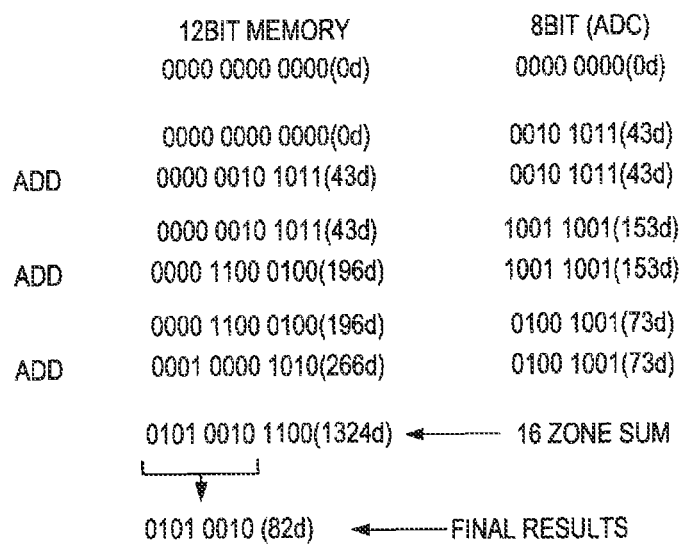
FIG. 2 illustrates an example of a values employed in the RMS device of FIG. 1.

Turning now to FIG. 2, illustrated is an example of a RMS detector sequence. In this example, the n bit register 160 is a twelve-bit memory register, and the ADC 140 is an eight-bit ADC.

In this example, 12 microseconds, a period that is to be determined to have a final RMS value, is divided into certain time zones, such a sixteen time zones, wherein one time zone equals 750 μs. In this example, integration by the integrator 120 is changed from 0000 0000(0d) to 0010 1011(43d). Then, within the digital adder 150, 0000 0000 0000(d) from the twelve bit register 160 is added to the 0010 1011(43d). Within the 12 bit memory, this then equals 0000 0010 1011(43d). This is the value for the first time zone of RMS values.

Then, a second reading, that of 1001 1001(153d) is conveyed to the digital adder 150. The 12 bit memory conveys the value 0010 1011(43d) to the digital adder 150. This is added to become the value 0000 1100 0100(196d). This is the value for the second time zone of RMS values.

Then, a third reading, that of 0100 1001(73d) is conveyed to the digital adder 150. The 12 bit memory conveys the value 0000 1100 0100(196d) to the digital adder 150. This is added to become the value 0001 0000 1010(296d) within the n bit register 160. This is the value for the second time zone of RMS values. This can continue for a number of time zones over which the RMS value is determined. In the present example, the number of summed values for the times zones equal 0101 0010 1100(1324d), as a sixteen zone sum, as stored within the n bit register 160.

In a further embodiment, within the series port/logic value, a final RMS value, such as 0101 0010 1100(1324d), is employed to determine whether a HDD has occurred. In a yet further embodiment, the sum value is truncated, an only a given number of bits of the sum is used. In the illustrated embodiment, the first eight bits of the sixteen zone sum are used. This is value 0101 0010(82d). From this value, the logic 170 determines whether a HDD has occurred. In one embodiment, this determination is made by the logic 170.

Figure 3:
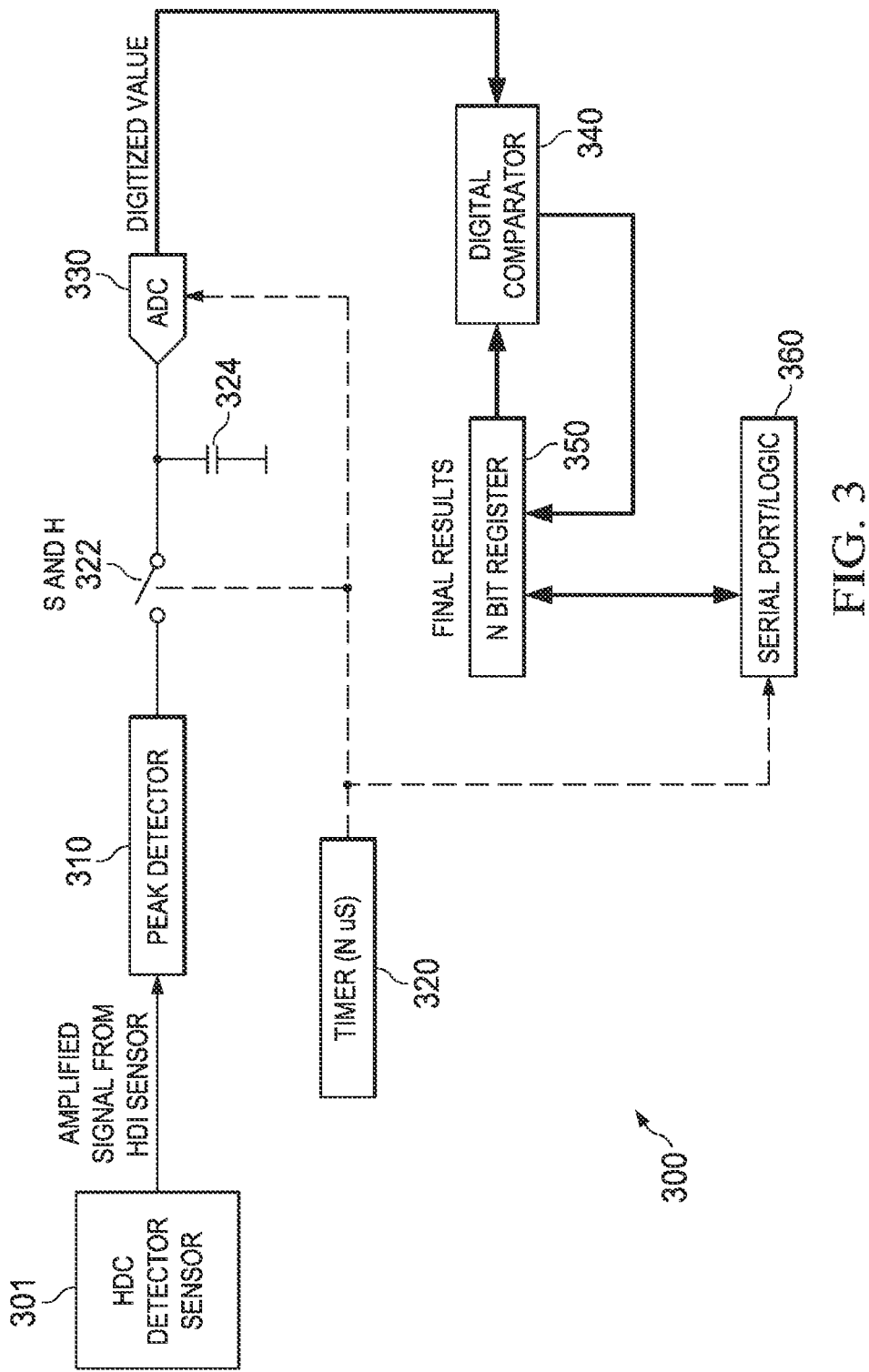
FIG. 3 is an example of a peak value detector that determines a touch-down.

Turning now to FIG. 3, illustrated is a touch-down detector 300. In the touch-down detector 300, a signal, such as an amplified analog signal from an HDC detection sensor 301, is conveyed to a peak detector 310.

The output of the peak detector 310 is then coupled to a S and H switch 322. The S and H switch 322 is driven by a timer 320. In one embodiment, the timer 320 increments in nanoseconds. The S and H switch 322 is coupled to a capacitor 324. The capacitor 324 is coupled to ground.

In the touch-down detector 300, a signal is received. A peak value is generated by the peak detector 310, is then sampled by the S and H switch 322, and held at a capacitor 324. Then, the sampled analog signal is converted in an analog-to-digital converter ('ADC') 330. The timer 320 also drives the ADC conversion, and the timer 320 is coupled to the ADC 330. This digitized value representing an integrated individual time slice of an analog peak value is then conveyed to a digital comparator 340. Coupled to the digital comparator 340 is an n bit register 350. The digital comparator 340 conveys a higher of the two compared values to the n bit register 350, which stores the final results.

The n bit register 350 is also coupled to a logic 360, which is also coupled to the timer 320. The logic 360 can itself be used to determine whether a touch-down has actually occurred through comparison the final results to a peak threshold value, or whether the circuit 300 is instead encountering other noise.

Generally, the touch-down detector 300 determines discrete time intervals of peak values, and then compares those values. Generally, in the peak detector 300, a whole measured period is divided into time zones, and a peak value is digitized for each zone, each time zone controlled by the timer 320, and a higher of a comparison of values is stored as a digital value in the n bit register 350. When determining peak values, the digital value can be compared repeatedly during one of multiple rotations period, then the sum of the digital values as determined by the digital comparator 340 is the peak value of the whole period, which can then be used as a criteria for a touch-down through comparison to the peak-threshold value.

Figure 4:
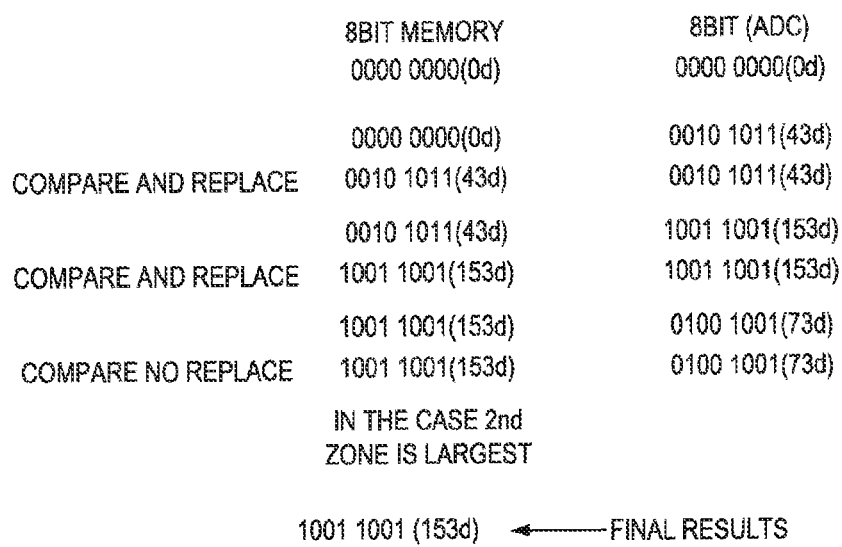
FIG. 4 is an example of a values employed in the peak value detector of FIG. 3.

Turning now to FIG. 4, illustrated is an example of a peak detector sequence. In this example, the n bit register 350 is an eight-bit memory register, and the ADC 330 is an eight-bit ADC.

In this example, 12 milliseconds, a period for which is to have determined a peak value, is divided into certain time zones, such a sixteen time zones, wherein one time zone equals 750 μs. In this example, a peak value, previously 0000 0000(0d), after a first comparison, is then 0010 1011(43d). Then, within the digital comparator 0000 0000(d) from the eight-bit register 350 is compared to the 0010 1011(43d). Within the eight bit memory, the higher comparison value of these two then equals 0010 1011(43d), and this replaces 0000 0000(d). This is the value for the first time zone of peak values.

Then, a second reading, that of 1001 1001(153d) is conveyed to the digital comparator 340. The eight bit memory conveys the value 0010 1011(43d) to the digital comparator 340. A comparison occurs, and the value 1001 1001(153d) is the larger, and a replacement of 1001 1001(153d) for 0010 1011(43d) occurs. The value 1001 1001(153d) is the value for the second time zone of peak values.

Then, a third reading, that of 0100 1001(73d) is conveyed to the digital comparator 340. The 8 bit memory conveys the value 1001 1001(153d) to the digital comparator 340. This is compared within the digital comparator and the value 1001 1001(153d) is determined to be within the n bit register 350, and there is no replacement. This can continue for a number of time zones over which the peak value is determined. In the present example, the number of compared values for the times zones is for the 2nd zone is the largest.

In a further embodiment, within the logic, a final peak value, such as 1001 1001(153d), is employed to determine whether a touch-down has occurred.

Figure 5:
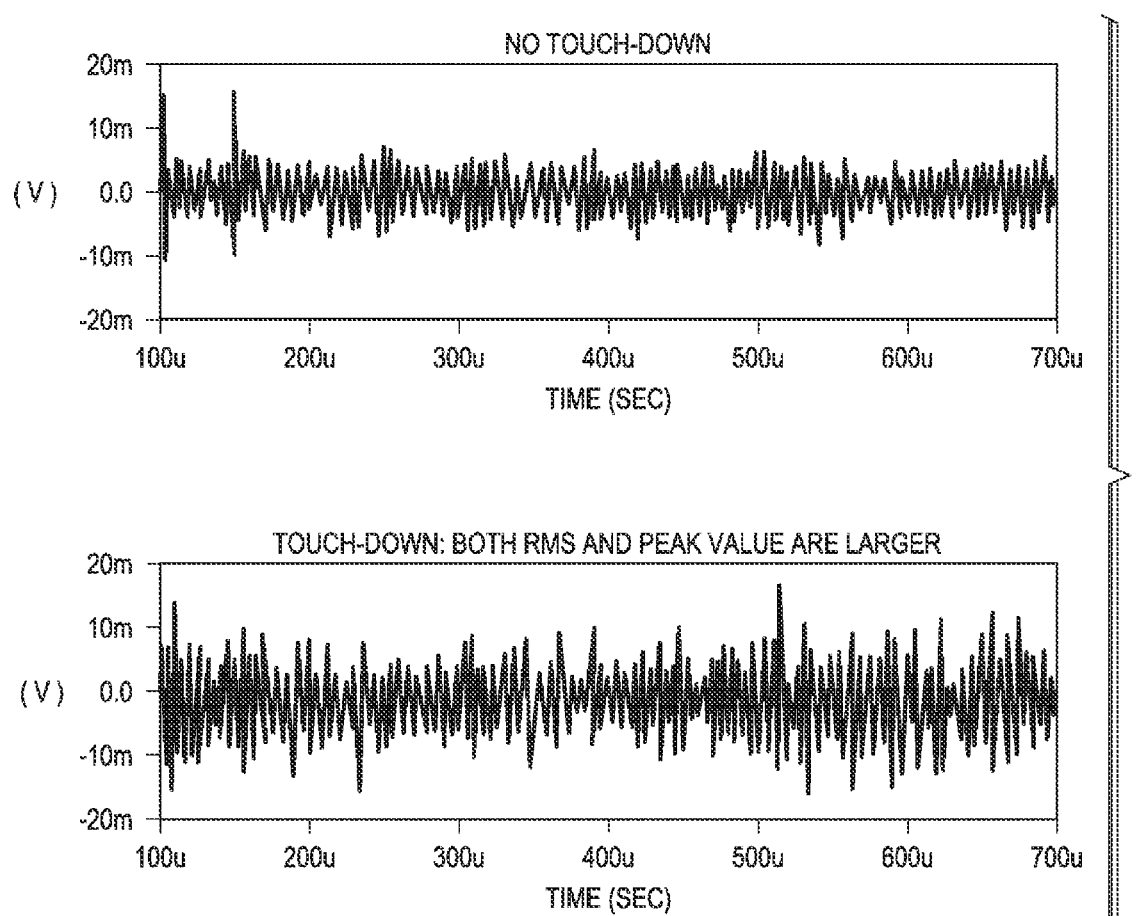
FIG. 5 is an example of prior art noise values both before and after touch-down.

FIG. 5 includes illustrations of prior art noise from a hard drive contact sensor with no touch-down, and with a touch-down. As is illustrated, both the RMS and Peak values are larger when a touch-down occurs as compared to when a touch-down does not occur.

Figure 6:
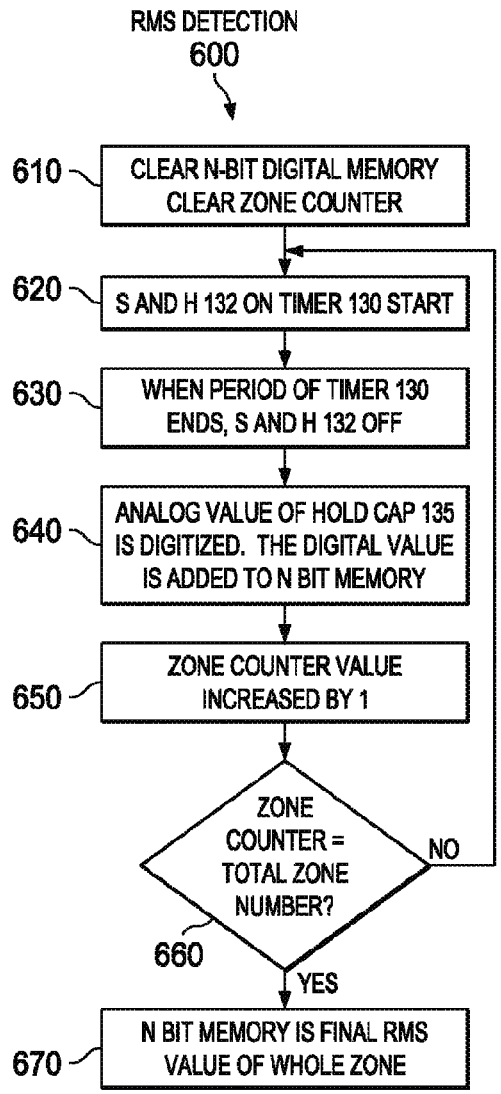
FIG. 6 is an exemplary method of an RMS detection in a touch-down.

FIG. 6 illustrates an exemplary method 600 that can be employed with RMS peak detection, such as can be used with the RMS detector 100. In a step 610, an n bit memory, such as the digital register 160, and a zone counter, such as can be contained within logic 170, are cleared. In a step 620, the S and H switch 132 is enabled, in other words a sample occurs, and the timer 130 is also enabled, in other words, the timer 130 is on and enables the S and H switch 132. In a step 630, when a period of timer 130 ends, the S and H switch 132 is turned off and a final value is obtained. Then, in a step 640, an analog value corresponding to a charge of the capacitor 135 is digitized, and the value is added by the digital adder 150 to an n bit memory, such as the n bit register 160. In a step 650, the zone counter value is increased by a value of 'one.'

In a step 660, it is determined if a zone counter equals a total zone number for a given RMS time interval. If not, the method 600 loops back to step 620. If yes, then in a step 670, the n bit memory, such as the n bit register 160, is the final value of a whole zone. In other words, an integration of RMS values has occurred, and it can be determined in the logic 170 whether a touch-down has in fact occurred based upon a comparison added digitized value of the total sampled RMS values and the RMS threshold value.

Figure 7:
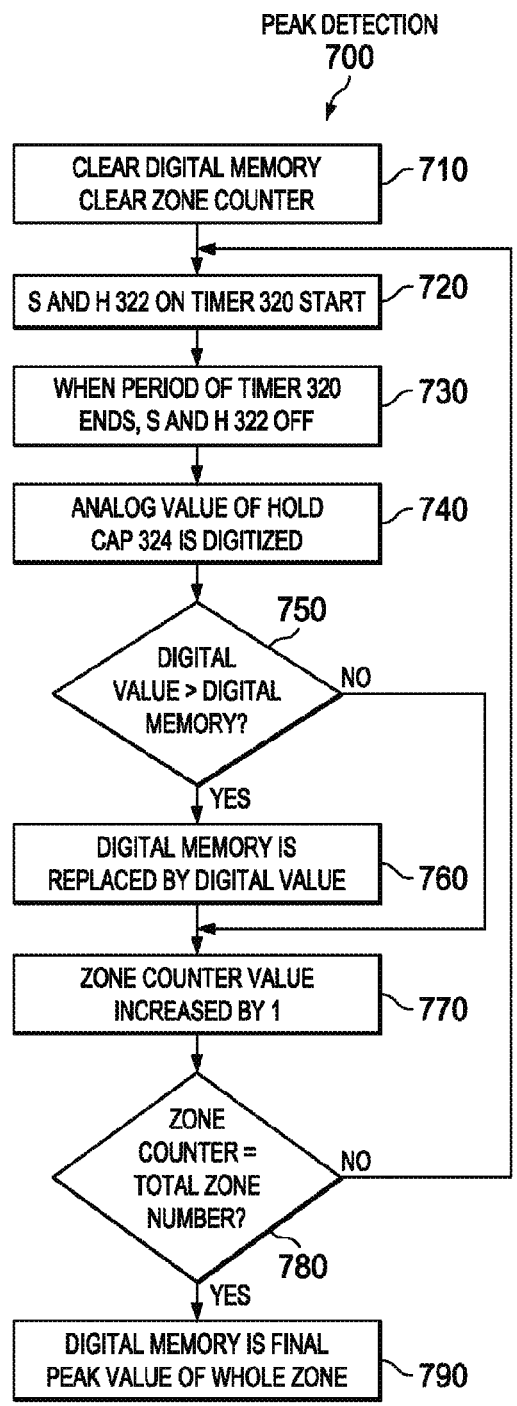
FIG. 7 is an exemplary method of a peak detection in a touch-down.

FIG. 7 illustrates a method 700 for a peak detection of a touch-down, such as can be employed with the touch-down detector 300. In a step 710, a digital memory, such as the n bit register 350, and a zone counter, such as may be located within the logic 360, are cleared. In a step 720, the S and H 322 and the timer 320 are started. In a step 730, when a period of timer 320 ends, S and H 322 is transitioned into off. In a step 740, an analog value of a charge of the hold capacitor, such as capacitor 324, is digitized. In a step 750, it is determined whether a digital value in the digital comparator 340 is greater than a digital memory value in a digital memory, such as the n bit register 350. If the value is greater, then in a step 760, the digital memory value is replaced by the digital value. Then, regardless of a result of the comparison of step 750, the method 700 advances to a step 770. In the step 770, the zone counter value is increased by a value of 'one' for a given touch-down peak detection. In a step 780, it is determined if the zone counter is equal to the total zone number. If not, then the method 700 loops back to the step 720. If the zone counter is indeed equal, then the digital memory in the n bit memory 350 becomes the final memory value for the final peak value. In a further embodiment, logic 370 makes a determination of whether a touch-down has actually occurred based upon the final peak value and another value, such as a stored value.

Those skilled in the art to which this application relates will appreciate that other and further additions, deletions, substitutions and modifications may be made to the described embodiments.

What is claimed is:

1. An apparatus, comprising:
   a root-mean-square ('RMS') value generator;
   an integrator coupled to the RMS value generator;
   a sample and hold switch coupled to an output of the integrator;
   a capacitor coupled between the sample and hold switch and a ground;
   an input of an analog to digital convertor ('ADC') coupled to the capacitor;
   an adder coupled to an output of the ADC;
   a register, wherein an output of the register is coupled to an input of the adder; and wherein an output of the adder is coupled to an input of the bit register;
   a logic coupled to the register for comparing an output of the register to an RMS threshold value for determining whether a touch-down has occurred; and
   wherein the logic employs a first eight of twelve bits in the bit register to determine whether the touch-down has occurred.

2. The apparatus of claim 1, further comprising a timer coupled to: the sample and hold switch, and the ADC.

3. The apparatus of claim 1, wherein the register is a twelve bit register.

4. The apparatus of claim 1, wherein the determining of whether the touch-down occurs over a plurality of rotations of a hard drive.

5. The apparatus of claim 1, wherein a Head-Disk Contact ('HDC') detection sensor is coupled to the RMS value generator.

6. The apparatus of claim 1, further comprising:
   a timer coupled to:
      the sample and hold switch,
      the ADC; and
      the logic;
   wherein the RMS value generator further comprises a rectifier;
   wherein the adder is a digital adder;
   wherein the register is a twelve bit register;
   wherein a Head-Disk Contact detection sensor is coupled to the RMS value generator;
   wherein the determining of whether the touch-down has occurred occurs over a plurality of rotations of a hard drive; and
   wherein the logic compares a first eight of twelve bits in the bit register to an RMS threshold value to determine whether the touch-down has occurred.

7. An apparatus, comprising:
   a peak value generator, wherein the peak value generator further comprises a rectifier,
   a sample and hold switch coupled to an output of the peak value generator;
   a capacitor coupled between the sample and hold switch and a ground;
   an input of an analog digital convertor ('ADC') coupled to the capacitor;
   a comparator coupled to an output of the ADC;
   a register, wherein an output of the register is coupled to the comparator; and wherein an output of the comparator is coupled to the register; and
   a logic coupled to the register for comparing an output of the register to a peak threshold value for determining whether a touch-down has occurred, and
   a timer coupled to:
      the sample and hold switch,
      the ADC; and
      the logic;
   wherein the touch-down is determined over a plurality of rotations of a hard drive,
   wherein a Head-Disk contact ('HDC') detection sensor is coupled to the peak value generator including the rectifier; and
   wherein an HDC signal is received by the peak detector from the HDC sensor; and
   wherein the logic compares bits in the bit register to a peak threshold value to determine whether the touch-down has occurred, and
   wherein the logic employs a first eight of twelve bits in the bit register to determine whether the touch-down has occurred.

8. The apparatus of claim 7, wherein a head disk interface Head-Disk Contact detection sensor is coupled to the peak value generator.

9. The apparatus of claim 8, wherein a Head-Disk Contact detection signal is received by the peak detector from the Head-Disk Contact detection sensor.

10. The apparatus of claim 7, wherein the peak detector includes an RMS detector.

11. The apparatus of claim 10, further including an integrator coupled between the peak detector and the logic.

12. An apparatus, comprising:
   a Head-Disk Contact ('HDC') detection sensor;
   a root-mean-square ('RMS') value generator coupled to the HDC detection sensor;
   an integrator coupled to the RMS value generator;
   a sample and hold switch coupled to an output of the integrator;
   a capacitor coupled between the sample and hold switch and a ground;
   an input of an analog digital capacitor ('ADC') coupled to the capacitor;
   an adder coupled to an output of the ADC;
   a register, wherein an output of the register is coupled to an input of the adder; and wherein an output of the adder is coupled to an input of the register;
   a logic coupled to the register for comparing an output of the register to a RMS threshold value for determining whether a touch-down has occurred; and
   wherein an output value of the register is derived from a plurality of RMS value samples,
   a timer coupled to:
      the sample and hold switch,
      the ADC; and
      the logic;
   wherein the RMS value generator further comprises a rectifier;
   wherein the adder is a digital adder;
   wherein the register is a twelve bit register;
   wherein a Head-Disk Contact detection sensor is coupled to the RMS value generator;
   wherein the determining of whether the touch-down has occurred occurs over a plurality of rotations of a hard drive;

wherein the plurality of RMS value samples are added together by the digital adder and stored in the bit register; and wherein the logic compares a first eight of twelve bits in the bit register to an RMS threshold value to determine whether the touch-down has occurred.

13. The apparatus of claim 12, wherein the plurality of RMS value samples are added together and compared to the RMS threshold value.

* * * * *